(12) United States Patent
Jeon et al.

(10) Patent No.: US 8,176,519 B2
(45) Date of Patent: May 8, 2012

(54) METHOD AND SYSTEM FOR TRANSMITTING PLURAL DATA IN PORTABLE BROADCASTING SERVICE

(75) Inventors: Jin-Woo Jeon, Seongnam-si (KR); Jae-Yeon Song, Seoul (KR); Young-Jip Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 692 days.

(21) Appl. No.: 12/251,064

(22) Filed: Oct. 14, 2008

(65) Prior Publication Data

US 2009/0100472 A1 Apr. 16, 2009

(30) Foreign Application Priority Data

Oct. 12, 2007 (KR) .................. 10-2007-0103249

(51) Int. Cl.
*H04N 7/16* (2011.01)
(52) U.S. Cl. ............ 725/62; 725/39; 725/48; 455/414.3
(58) Field of Classification Search .............. 725/62
See application file for complete search history.

(56) References Cited

U.S. PATENT DOCUMENTS

| 2005/0090234 A1* | 4/2005 | Ioku et al. ................ 455/412.2 |
| 2006/0053450 A1* | 3/2006 | Saarikivi et al. ............ 725/46 |
| 2006/0218586 A1* | 9/2006 | Pohjolainen et al. ......... 725/39 |
| 2006/0285508 A1* | 12/2006 | Vermola et al. ............. 370/312 |
| 2007/0300265 A1* | 12/2007 | Karkkainen .................. 725/62 |
| 2008/0022352 A1* | 1/2008 | Seo et al. .................... 725/142 |

FOREIGN PATENT DOCUMENTS

KR 1020070043396 4/2007

* cited by examiner

*Primary Examiner* — Pankaj Kumar
*Assistant Examiner* — Timothy Newlin
(74) *Attorney, Agent, or Firm* — The Farrell Law Firm, P.C.

(57) ABSTRACT

A method and system for transmitting a plurality of ESG data to an MS over a communication network in a DVB-H CBMS portable broadcasting service are provided. The MS requests ESG data over the communication network, a server collects the requested ESG data and transmits at least one of the collected ESG data in an ESG data group file to the MS over the communication network. The MS receives the ESG data group file and stores the ESG data included in the ESG data group file.

20 Claims, 3 Drawing Sheets

METHOD AND SYSTEM FOR TRANSMITTING PLURAL DATA IN PORTABLE BROADCASTING SERVICE

PRIORITY

This application claims priority under 35 U.S.C. §119(a) to a Korean Patent Application filed in the Korean Intellectual Property Office on Oct. 12, 2007 and assigned Serial No. 2007-103249, the entire disclosure of which is incorporated herein by reference.

BACKGROUND OF THE INVENTION

1. Field of the Invention

The present invention relates generally to a method and system for transmitting data to a Mobile Station (MS) over a communication network in a Digital Video Broadcast-Handheld Convergence of Broadcast and Mobile Services (DVB-H CBMS) portable broadcasting service. The present invention relates more particularly to a method and system for transmitting data related to a plurality of MS-requested Electronic Service Guides (ESGs) over a communication network.

2. Description of the Related Art

The mobile communication market faces an ever-increasing demand for new services through re-combination or convergence of existing technologies. Due to the continuing development of communications and broadcasting technologies, legacy broadcasting or mobile communication systems are now capable of providing portable broadcasting services to portable terminals (hereinafter, referred to as MSs), such as Personal Digital Assistants (PDAs). The driving forces behind a trend of converging mobile communications and Internet Protocol (IP) in future-generation mobile communication developments include: potential and actual market demands, increasing user demand for multimedia service, service providers' strategies for providing new services beyond conventional voice service, and Information Technology (IT) companies' profit and loss calculations to re-enforce their mobile communication business for meeting customer demands. In this context, portable broadcasting services are under active commercialization and standardization so that such services may be provided to MSs.

A commercial service is has been provided in compliance with DVB-H CBMS in Italy, and a commercial service based on the Nokia-Open Air Interference (OAI) standard has been provided in Vietnam. There are a variety of other standards associated with portable broadcasting services, including S/T Digital Multimedia Broadcasting (S/T-DMB), MediaFlo, DVB-Satellite services to Handheld (DVB-SH), and Open Mobile Alliance Mobile Broadcast (OMA-BCAST). DVB-H CBMS, DVB-SH, Nokia-OAI, and Open Mobile Alliance Mobile Broadcast (OMA-BCAST) commonly use a DVB-H network as a lower transmitting end and require reception of ESG data to provide a portable broadcasting service. However, the ESG data of each standard is based on a different data model, and each standard has different elements and attributes in ESG fragments.

One common requirement from service providers that provide portable broadcasting services over a DVB-H network is simultaneous transmission of ESG data over both a broadcasting network and a communication network. OMA-BCAST offers techniques for enabling convergence between a communication network and a broadcasting network in various aspects in addition to ESG data reception. Therefore, the ESG data should include guide information about communication contents provided over the communication network, as well as guide information about broadcasting contents provided over the broadcasting network. Standardization has commenced relating to transmission of ESG dam over both broadcasting and communication networks.

Typically, ESG data is transmitted to an MS in a plurality of fragments during a portable broadcasting service, and usually in two sessions. An Announcement Session includes transmission of information about how the fragments are created, information about a network over which they are transmitted, and IP address information or Universal Resource Identifier (URI) information for reception of the fragments. Hence, the MS acquires information required for ESG data reception in the Announcement Session. Based on the acquired information, the MS receives actual ESG fragments in an ESG Data Session. Aside from these two sessions, the DVB-H/DVB-SH standard defines an ESG Bootstrap Session. The ESG Bootstrap Session provides a method for selecting a particular ESG data provider and an ESG access descriptor, when there is a plurality of ESG data providers.

FIG. 1 is a diagram illustrating the configuration of the conventional ESG Bootstrap Session.

Referring to FIG. 1, an ESG Bootstrap Session 100 includes a Formal Description Technique (FDT) instance 101, an ESG provider discovery descriptor 103, and an ESG access descriptor 105. The ESG provider discovery descriptor 103 includes a list of ESG data providers, i.e. a list of ESG data servers. The ESG access descriptor 105 includes ESG data access information regarding each ESG data provider. In the illustrated case of FIG. 1, a single ESG provider exists, by way of example. Thus, an ESG single stream session 110 is configured to include an FDT instance 111, an ESG Initial (Init) container 113, an ESG Index container 115, and n ESG fragment containers 117 to 119.

A broadcasting server broadcasts this ESG Bootstrap Session 100 to an MS over a broadcasting network, or transmits it to the MS over a communication network. If particular ESG data is needed, the MS requests the ESG data from a broadcasting server or a predetermined ESG data server over a communication network. Then the server transmits the requested ESG data to the MS over the communication network. According to a DVB-H ESGoIA standard document defining this process, the MS requests and receives Bootstrap information, an ESG delivery list, a container list, a complete ESG and containers in HyperText Transfer Protocol (HTTP). When requesting the information, the MS should explicitly indicate requested data using a type attribute in a message body of an ESG Query in compliance with the HTTP/1.1 standard. For example, to request necessary containers, the MS sets type=ESGContainer in the HTTP/1.1 message body. Then the server transmits the containers to the MS.

When the MS requests ESG data over the communication network, it receives the ESG data in containers or fragments defined by the DVB-H CBMS standard. If the MS requests two or more data files, it cannot receive them at one time. For example, when the MS should receive a plurality of containers, it first receives a container list from the server and re-requests each container included in the container in HTTP. The repeated requests and responses are time consuming, thereby increasing the cost of using the communication network.

SUMMARY OF THE INVENTION

The present invention has been made to address at least the above problems and/or disadvantages and to provide at least the advantages described below. Accordingly, an aspect of the present invention provides a method and system for receiving a plurality of ESG data at one time over a communication network.

According to one aspect of the present invention, a method is provided for transmitting a plurality of data in a portable broadcasting service in which a broadcasting service is provided over a communication network and a broadcasting network. The MS requests ESG data over the communication network. A server collects the requested ESG data and transmits at least one of the collected ESG data in an ESG data group file to the MS over the communication network. The MS receives the ESG data group file and stores the ESG data included in the ESG data group file.

According to another aspect of the present invention, a system is provided for transmitting a plurality of data in a portable broadcasting service in which a broadcasting service is provided over a communication network and a broadcasting network. An MS requests ESG data over the communication network, receives an ESG data group file for the requested ESG data, and stores ESG data included in the ESG data group file. A server collects the requested ESG data and transmits at least one of the collected ESG data in the ESG data group file to the MS over the communication network.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF PREFERRED EMBODIMENTS

Figure 1:
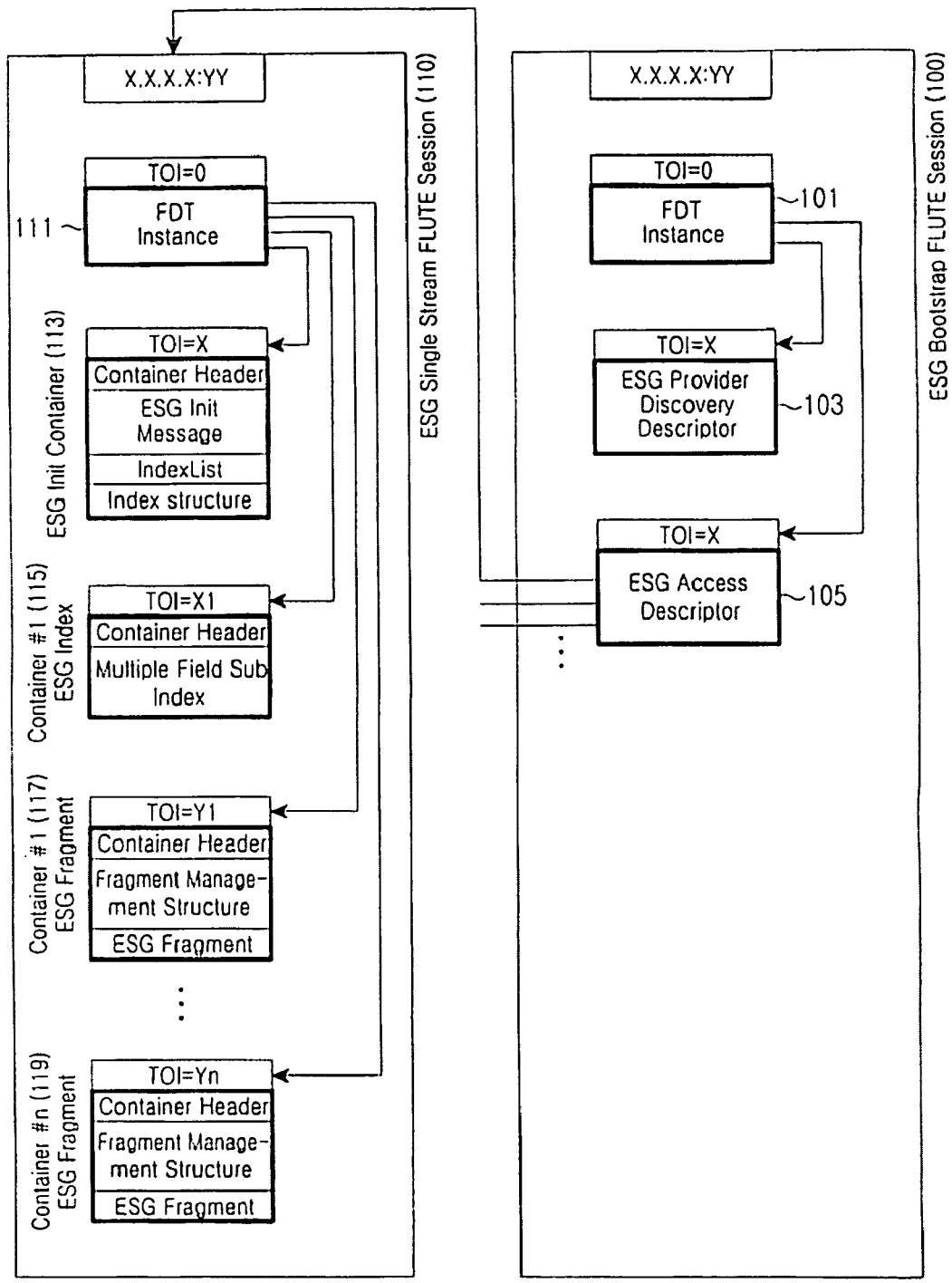
FIG. 1 is a diagram illustrating the configuration of an ESG Bootstrap Session.

Preferred embodiments of the present invention are described in detail with reference to the accompanying drawings. The same or similar components are designated by the same or similar reference numerals although they are illustrated in different drawings. Detailed descriptions of constructions or processes known in the art may be omitted to avoid obscuring the subject matter of the present invention.

Figure 2:
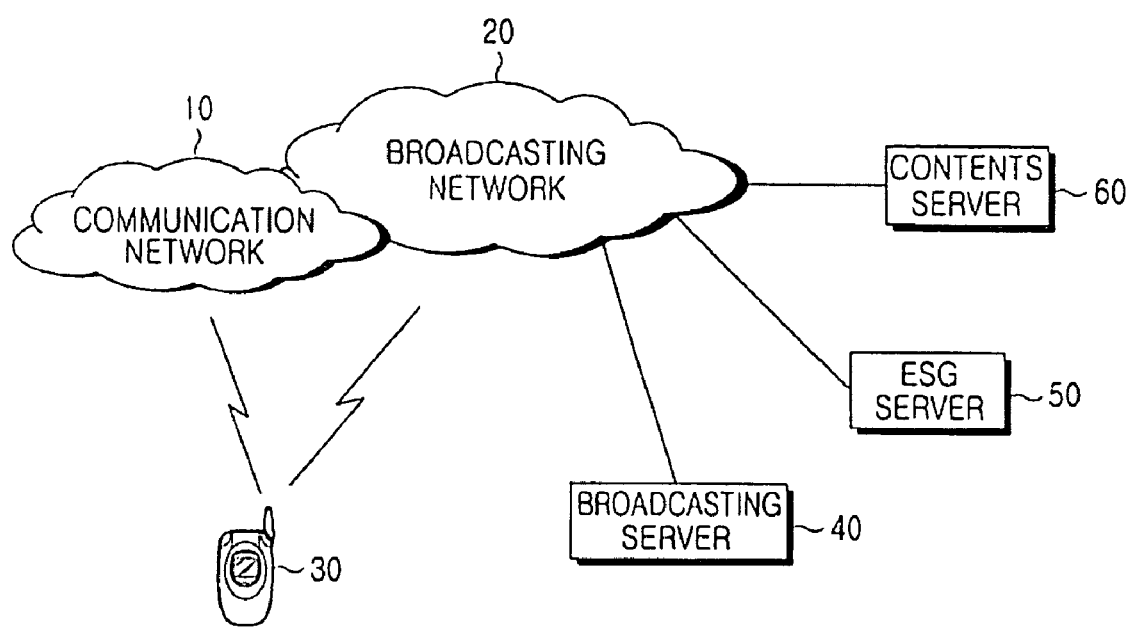
FIG. 2 is a diagram illustrating the configuration of a portable broadcasting system according to an embodiment of the present invention.

FIG. 2 is a diagram illustrating the configuration of the portable broadcasting system according to an embodiment of the present invention.

Referring to FIG. 2, the portable broadcasting system includes a communication network 10, a broadcasting network 20, an MS 30, a broadcasting server 40, an ESG server 50, and a contents server 60.

The communication network 10 provides a wired communication service, a mobile communication service, and a broadcasting service associated with a portable broadcasting service. The broadcasting network 20 provides a broadcasting service associated with a portable broadcasting service.

The MS 30 can be a portable terminal such as a PDA. The MS 30 provides the portable broadcasting service received over the communication network 10 and the broadcasting network 20 to a user. It is also capable of performing a communication service like mobile communications. The contents server 60 is a server for providing various broadcasting contents in the portable broadcasting service, including TV programs, games, and commercials. The ESG server 50 configures ESG data related to contents received from the contents server 60, and provides the ESG data to the broadcasting server 40. Upon request of the MS 30, the ESG server 50 can provide requested ESG data to the MS 30 over the broadcasting network 20. The broadcasting server 40 provides broadcasting contents received from the contents server 60 and the ESG server 50 to the MS 30 over the communication network 10 and the broadcasting network 20 according to a portable broadcasting service standard.

In the above portable broadcasting system, operations in which the MS 30 requests ESG data from a server and the server transmits the requested ESG data to the MS 30 according to the present invention will be described with reference to FIGS. 3 and 4. The server can be the broadcasting server 40, the ESG server 50, or a dedicated server for providing ESG data only over the communication network 10 upon request of the MS 30. The server that provides ESG data has a fixed address that is pre-stored in the MS 30 or transmitted to the MS 30 in an ESG stream session. By way of example, in the following description the broadcasting server 40 provides ESG data.

Figure 3:
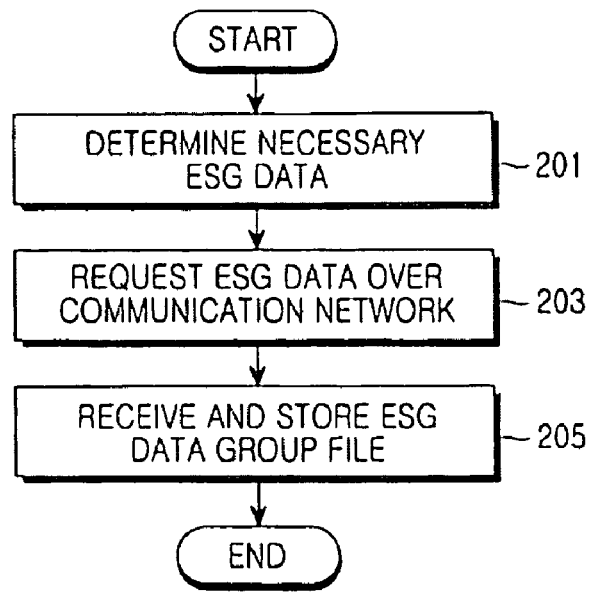
FIG. 3 is a flowchart illustrating an operation of an MS according to an embodiment of the present invention.

Referring to FIG. 3, the MS 30 determines necessary ESG data in step 201. For example, the MS 30 requires ESG data if the broadcasting network 20 is under an unstable radio environment and thus the MS 30 cannot receive all ESG data broadcast over the broadcasting network 20, or if the MS 30 has not received the latest-version ESG data. The user may also require particular ESG data. The MS 30 requests the ESG data by configuring an ESG query and transmitting it to the broadcasting server 40 over the communication network 10 in step 203. The necessary ESG data may be singular or plural. The ESG data group file is received and stored in step 205.

Figure 4:
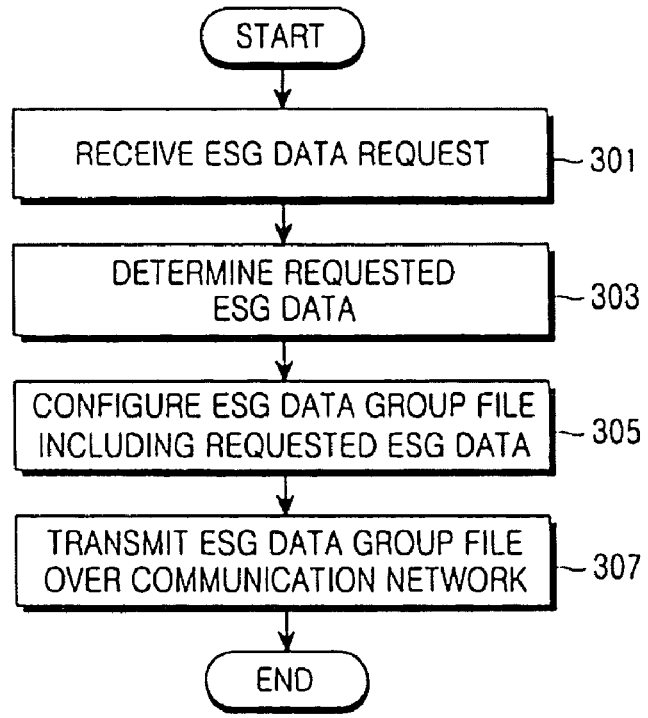
FIG. 4 is a flowchart illustrating an operation of a broadcasting server according to an embodiment of the present invention.

Referring to FIG. 4, the broadcasting server 40 receives the ESG data request in step 301 and determines the version, type, etc., of the requested ESG data by analyzing the ESG query in step 303. When requesting the ESG data, the MS 30 can set the version of the ESG data in a message body of the ESG data request, i.e. a message body of the ESG query, or a key-value pair of a URL. Alternatively, the MS 30 can notify of the ESG version without including it in the ESG data request. Thus, the broadcasting server 40 can detect the ESG version. If the MS 30 does not explicitly indicate the ESG version, the broadcasting server 40 selects the latest ESG version and transmits the ESG data of the selected version. In step 305, the broadcasting server 40 collects the ESG data. If there is a plurality of ESG data, the broadcasting server 40 groups them and configures an ESG data group file by including the grouped ESG data in a file configured like an ESG data group syntax illustrated in Table 1. If the ESG data is singular, the broadcasting server 40 is also able to transmit it in an ESG data group file.

TABLE 1

| Syntax | Number of bits | Mnemonics |
| --- | --- | --- |
| esgDataGroup( ){ | | |
|   esgDataGroup_header{ | | |
|     response_type | 8 | uimbsf |
|     num_esg_data | 8 | uimbsf |
|     for (j=0; j<num_esg_data; j++) { | | |
|       esg_data_type[j] | 8 | uimbsf |
|       esg_data_encoding[j] | 1 | uimbsf |
|       Reserved | 7 | uimbsf |

TABLE 1-continued

| Syntax | Number of bits | Mnemonics |
|---|---|---|
| esg_data_id[j] | 16 | uimbsf |
| esg_data_version[j] | 16 | uimbsf |
| esg_data_ptr[j] | 24 | uimbsf |
| esg_data_length[j] | 24 | uimbsf |
| if(esg_data_type[j] == 0x30) { | | |
| aux_header_length | 16 | uimbsf |
| aux_header{ | 8 × aux_header_length | a list of two null separated strings |
| metadataURI | | |
| MimeType | | |
| } | | |
| } | | |
| } | | |
| } | | |
| for (j=0; j<num_esg_data; j++) { | | |
| esg_data_body( ) | | |
| } | | |
| } | | |

Referring to Table 1, the header of the ESG data group file (esgDataGroup_header) includes a response type field (response_type), an ESG data number field (num_esg_data), an ESG data type (esg_data_type) field, an ESG data encoding field (esg_data_encoding), an ESG data IDentifier (ID) field (esg_data_id), an ESG data version field (esg_data_version), an ESG data offset field (esg_data_ptr) field, an ESG data length (esg_data_length) field, and an auxiliary data field.

response_type indicates a request of the MS 30 for which the ESG data group file is a response. Hence, a value indicating the type of the ESG query that the MS 30 transmitted to request ESG data is set in response_type. Available values that can be filled in response_type are listed in Table 2 below.

TABLE 2

| Value | Meaning |
|---|---|
| 0x00 | ContainerList |
| 0x01 | ESGContainer |
| 0x02 | Ipdcindex |
| 0x03 | Bootstrap |
| 0x04-0xE0 | Reserved |
| 0xE1-0xFF | User defined |

As the broadcasting server 40 sets response_type to a value defined in Table 2, the MS 30 can identify a request for which the ESG data group file is a response and determine a usage of data included in the ESG data group file. Consequently, the MS 30 can analyze the ESG data group file fast and also determine whether a response for a transmitted request has been received successfully.

Referring to Table 1 again, num_esg_data indicates the number of ESG data included in the ESG data group file.

esg_data_type indicates the type of the ESG data included in the ESG data group file. ESG data types can be defined as in Table 3 below.

TABLE 3

| Value | Meaning |
|---|---|
| 0x00 | ESGProviderDiscovery Descriptor |
| 0x01 | ESGAccess Descriptor |
| 0x02-0x0F | Reserved |
| 0x10 | ESG Int Container |
| 0x11 | ESG Index Container |
| 0x12 | ESG Fragment Container |
| 0x13-0x1F | Reserved |
| 0x20 | esg: ESGMain Fragment |
| 0x21 | esg: ContentFragment |

TABLE 3-continued

| Value | Meaning |
|---|---|
| 0x22 | esg: ScheduleEventFragment |
| 0x23 | esg: ServiceFragment |
| 0x24 | esg: ServiceBundle Fragment |
| 0x25 | esg: Acquisition Fragment |
| 0x26 | esg: PurchaseFragment |
| 0x27 | esg: PurchaseChannelFragment |
| 0x28-0x2F | Reserved |
| 0x30 | AuxData |
| 0x31-0xE0 | Reserved |
| 0xE1-0xFF | User defined |

As the ESG data group file includes an ESG data type listed in Table 3, the MS 30 can identify the type of the ESG data included in the ESG data group file.

Referring to Table 1, esg_data_encoding is a 1-bit field indicating whether ESG data is compressed by GNU zip (gzip). If esg_data_encoding is 1, it means that the ESG data is compressed by gzip.

esg_data_id has a unique ID of ESG data. esg_data_version indicates the version of ESG data included in the ESG data group file. esg_data_ptr is a byte offset from the start of the ESG data group file to ESG data, esg_data_length indicates the byte length of one data starting from the position indicated by the offset value set in esg_data_ptr.

The auxiliary data field provides information about auxiliary data (aside from main ESG data) related to a broadcasting program or a broadcasting channel, i.e. the type of other data, the name of auxiliary data, etc. The auxiliary data can be a Session Description Protocol (SDP) file, a channel logo image, or the like. When auxiliary data is included in the ESG data group file, esg_data_type is set to 0x30 indicating auxiliary data. The auxiliary data field includes aux_header_length and aux_header. aux_header_length indicates the length of the auxiliary data included in the ESG data group file, aux_header includes metadataURI in which the file name of the auxiliary data, for example, channel1.sdp or channel1.gif, is stored, and MimeType in which the mime type of the auxiliary data file, such as text/xml or image/gif, is stored. The information of aux_header may take the form of a string discriminated by null. A string part before the null is metadataURI and the other string part after the null is MimeType.

esg_data_body carries actual data that may include those listed in Table 3. If esg_data_body carries a container, it can include data configured like a syntax illustrated in Table 4.

TABLE 4

| Syntax | Number of bits | Mnemonic |
|---|---|---|
| Container( ) { | | |
| container_header { | | |
| num_structures | 8 | uimsbf |
| for (j=0; j<num_structures; j++) { | | |
| structure_type[j] | 8 | uimsbf |
| structure_id[j] | 8 | uimsbf |
| structure_ptr[j] | 24 | uimsbf |
| structure_length[j] | 24 | uimsbf |
| } | | |
| } | | |
| for (j=0; j<byte_count; j++) { | | |
| structure_body[j] | | |
| } | | |
| } | | |

If a container is delivered in esg_data_body, it may comply with "7.2.2 ESG Container Syntax" of DVB-H CBMS ESG.

Referring again to FIG. 4, the broadcasting server 40 transmits the ESG data group file having the above-described configuration to the MS 30 over the communication network 10 in step 307. In step 205 of FIG. 3, the MS 30 receives the ESG data group file and acquires information about the ESG data included in the ESG data group file by analyzing esg_DataGroup_header.

More specifically, the MS 30 determines a request for which the ESG data group file is a response, referring to response_type, the number of ESG data included in the ESG data group file by num_esg_data, and the types of the ESG data by esg_data_type. Then the MS 30 determines from esg_data_encoding whether the ESG data is compressed, and also finds out the ID of each ESG data by esg_data_id. The MS 30 detects the version of the ESG data by esg_data_version and locates the ESG data by esg_data_ptr and esg_data_length. By checking the auxiliary data field, the MS 30 detects information about auxiliary data in the ESG data group file.

In this manner, the MS 30 acquires information about the ESG data included in esg_data_body of the ESG data group file using the information of esg_DataGroup_header, stores the ESG data, and uses it.

As is apparent from the above description, the present invention advantageously enables an MS to acquire necessary ESG data and to receive a plurality of ESG data at one time during a portable broadcasting service over a communication network.

While the invention has been shown and described with reference to certain preferred embodiments thereof, it will be understood by those skilled in the art that various changes in form and details may be made therein without departing from the spirit and scope of the present invention as defined by the appended claims.

What is claimed is:

1. A mobile terminal method for transmitting data in a portable broadcasting service in which a broadcasting service is provided over a communication network and a broadcasting network, the method comprising the steps of:
   requesting Electronic Service Guide (ESG) data over the communication network to a server by the Mobile Station (MS);
   receiving, at the MS, an ESG data group file including a plurality of ESG data items in response to the request for the ESG data from the server, over the communication network; and
   storing the plurality of ESG data items included in the ESG data group file by the MS,
   wherein a header of the ESG data group file includes at least one information item about each of the plurality of ESG data items, and
   wherein the header of the ESG data group file further includes a response type field for storing information indicating an MS's request for which the ESG data group file is a response and an ESG data number field for storing the number of the plurality of ESG data items included in the ESG data group file.

2. The method of claim 1, wherein the header of the ESG data group file includes at least one information item indicating an MS's request for which the ESG data group file is a response, a number of the plurality of ESG data items included in the ESG data group file, a type of the plurality of ESG data items included in the ESG data group file, an Identifier (ID) of the plurality of ESG data items included in the ESG data group file, a version of the plurality of ESG data items included in the ESG data group file, and a position of the plurality of ESG data items included in the ESG data group file.

3. The method of claim 2, wherein the header of the ESG data group file further includes at least one information item indicating whether the plurality of ESG data items included in the ESG data group file is compressed, and information about auxiliary data included in the ESG data group file.

4. The method of claim 3, wherein in the header of the ESG data group file, the type of the plurality of ESG data items included in the ESG data group file is stored in an ESG data type field, the ID of the plurality of ESG data items included in the ESG data group file is stored in an ESG data ID field, the version of the plurality of ESG data items included in the ESG data group file is stored in an ESG data version field, the position of the plurality of ESG data items included in the ESG data group file is indicated by an ESG data offset field indicating a byte offset from a start of the ESG data group file to corresponding ESG data and an ESG data length field indicating a byte length of ESG data from a position indicated by the byte offset, the information indicating whether the plurality of ESG data items included in the ESG data group file are compressed is stored in an ESG data encoding field, and the information about auxiliary data included in the ESG data group file is stored in an auxiliary data field.

5. The method of claim 4, wherein the auxiliary data field stores information about the auxiliary data, excluding ESG data, associated with a broadcasting program or a broadcasting channel, and includes an auxiliary header length field indicating a length of the auxiliary data and an auxiliary header field, the auxiliary header field having a meta data Universal Resource Identifier (URI) field indicating a file name of the auxiliary data and a mime type field indicating a mime type of the auxiliary data file.

6. The method of claim 4, wherein the response type field indicates one of a container list response, an ESG container response, an ipdcindex response, a Bootstrap response, and a user defined response.

7. The method of claim 4, wherein the ESG data type field indicates one of a plurality of ESG data types, the plurality of ESG data types comprising an ESG provider discovery descriptor, an ESG access descriptor, an ESG initial container, an ESG index container, an ESG fragment container, an ESG main fragment, an ESG content fragment, an ESG schedule event fragment, an ESG service fragment, an ESG service bundle fragment, an ESG acquisition fragment, an ESG purchase fragment, an ESG purchase channel fragment, auxiliary data, and a user defined type.

8. A mobile station for transmitting data in a portable broadcasting service in which a broadcasting service is provided over a communication network and a broadcasting network, the mobile station comprising:
   a requesting means for requesting Electronic Service Guide (ESG) data over the communication network;
   a receiving means for receiving an ESG data group file including a plurality of ESG data items in response to the request for the ESG data from the server, over the communication network; and
   a storing means for storing the plurality of ESG data items included in the ESG data group file,
   wherein a header of the ESG data group file includes at least one information item about each of the plurality of ESG data items, and
   wherein the header of the ESG data group file further includes a response type field for storing information indicating an MS's request for which the ESG data group file is a response and an ESG data number field for storing the number of the plurality of ESG data items included in the ESG data group file.

9. The mobile station of claim 8, wherein the header of the ESG data group file includes at least one information item indicating an MS's request for which the ESG data group file is a response, a number of the plurality of ESG data items included in the ESG data group file, a type of the plurality of ESG data items included in the ESG data group file, an Identifier (ID) of the plurality of ESG data items included in the ESG data group file, a version of the plurality of ESG data items included in the ESG data group file, and a position of the plurality of ESG data items included in the ESG data group file.

10. The mobile station of claim 9, wherein the header of the ESG data group file further includes at least one information item indicating whether the plurality of ESG data items included in the ESG data group file is compressed and information about auxiliary data included in the ESG data group file.

11. The mobile station of claim 10, wherein in the header of the ESG data group file, the type of the plurality of ESG data items included in the ESG data group file is stored in an ESG data type field, the ID of the plurality of ESG data items included in the ESG data group file is stored in an ESG data ID field, the version of the plurality of ESG data items included in the ESG data group file is stored in an ESG data version field, the position of the plurality of ESG data items included in the ESG data group file is indicated by an ESG data offset field indicating a byte offset from a start of the ESG data group file to corresponding ESG data and an ESG data length field indicating a byte length of ESG data from a position indicated by the byte offset, the information indicating whether the plurality of ESG data items included in the ESG data group file are compressed is stored in an ESG data encoding field, and the information about auxiliary data included in the ESG data group file is stored in an auxiliary data field.

12. The mobile station of claim 11, wherein the auxiliary data field stores information about the auxiliary data, excluding ESG data, associated with a broadcasting program or a broadcasting channel, and includes an auxiliary header length field indicating a length of the auxiliary data and an auxiliary header field, the auxiliary header field having a meta data Universal Resource Identifier (URI) field indicating a file name of the auxiliary data and a mime type field indicating a mime type of the auxiliary data file.

13. The mobile station of claim 11, wherein the response type field indicates one of a container list response, an ESG container response, an ipdcindex response, a Bootstrap response, and a user defined response.

14. The mobile station of claim 11, wherein the ESG data type field indicates one of a plurality of ESG data types, the plurality of ESG data types comprising an ESG provider discovery descriptor, an ESG access descriptor, an ESG initial container, an ESG index container, an ESG fragment container, an ESG main fragment, an ESG content fragment, an ESG schedule event fragment, an ESG service fragment, an ESG service bundle fragment, an ESG acquisition fragment, an ESG purchase fragment, an ESG purchase channel fragment, auxiliary data, and a user defined type.

15. A server method for transmitting data in a portable broadcasting service in which a broadcasting service is provided over a communication network and a broadcasting network, the method comprising the steps of:

receiving, by the server, a request for Electronic Service Guide (ESG) data over the communication network to a server from a Mobile Station (MS);

collecting, by the server, a plurality of ESG data items in response to the request for the ESG data; and transmitting, by the server, an ESG data group file including the plurality of ESG data items to the MS over the communication network, wherein a header of the ESG data group file includes at least one information item about each of the plurality of ESG data items, and wherein the header of the ESG data group file further includes a response type field for storing information indicating an MS's request for which the ESG data group file is a response and an ESG data number field for storing the number of the plurality of ESG data items included in the ESG data group file.

16. The method of claim 15, wherein the header of the ESG data group file includes at least one information item indicating an MS's request for which the ESG data group file is a response, a number of the plurality of ESG data items included in the ESG data group file, a type of the plurality of ESG data items included in the ESG data group file, an Identifier (ID) of the plurality of ESG data items included in the ESG data group file, a version of the plurality of ESG data items included in the ESG data group file, and a position of the plurality of ESG data items included in the ESG data group file.

17. The method of claim 16, wherein the header of the ESG data group file further includes at least one information item indicating whether the plurality of ESG data items included in the ESG data group file is compressed, and information about auxiliary data included in the plurality of ESG data group file.

18. The method of claim 17, wherein in the header of the ESG data group file, the type of the plurality of ESG data items included in the ESG data group file is stored in an ESG data type field, the ID of the plurality of ESG data items included in the ESG data group file is stored in an ESG data ID field, the version of the plurality of ESG data items included in the ESG data group file is stored in an ESG data version field, the position of the plurality of ESG data items included in the ESG data group file is indicated by an ESG data offset field indicating a byte offset from a start of the ESG data group file to corresponding ESG data and an ESG data length field indicating a byte length of ESG data from a position indicated by the byte offset, the information indicating whether the plurality of ESG data items included in the ESG data group file are compressed is stored in an ESG data encoding field, and the information about auxiliary data included in the ESG data group file is stored in an auxiliary data field.

19. A server for transmitting data in a portable broadcasting service in which a broadcasting service is provided over a communication network and a broadcasting network, the server comprising:

receiving means for receiving a request for Electronic Service Guide (ESG) data over the communication network to a server from a Mobile Station (MS);

collecting means for collecting a plurality of ESG data items in response to the request for the ESG data; and transmitting means for transmitting an ESG data group file including the plurality of ESG data items to the MS over the communication network, wherein a header of the ESG data group file includes at least one information item about each of the plurality of ESG data items, and wherein the header of the ESG data group file further includes a response type field for storing information indicating an MS's request for which the ESG data group file is a response and an ESG data number field for storing the number of the plurality of ESG data items included in the ESG data group file.

20. The server of claim 19, wherein the header of the ESG data group file includes at least one information item indicating a type of the plurality of ESG data items included in the ESG data group file, an Identifier (ID) of the plurality of ESG data items included in the ESG data group file, a version of the plurality of ESG data items included in the ESG data group file, and a position of the plurality of ESG data items included in the ESG data group file, whether the plurality of ESG data items included in the ESG data group file is compressed and information about auxiliary data included in the ESG data group file.

* * * * *